(12) United States Patent
Ishikawa

(10) Patent No.: US 9,609,150 B2
(45) Date of Patent: Mar. 28, 2017

(54) INFORMATION PROCESSING SYSTEM CAPABLE OF AUTOMATICALLY CONFIGURING SETTINGS FOR FUNCTIONAL COOPERATION BETWEEN APPARATUSES, IMAGE PICKUP APPARATUS, METHOD OF CONTROLLING THE IMAGE PICKUP APPARATUS, AND STORAGE MEDIUM

(71) Applicant: CANON KABUSHIKI KAISHA, Tokyo (JP)

(72) Inventor: Akira Ishikawa, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 221 days.

(21) Appl. No.: 14/519,824

(22) Filed: Oct. 21, 2014

(65) Prior Publication Data

US 2015/0109440 A1 Apr. 23, 2015

(30) Foreign Application Priority Data

Oct. 23, 2013 (JP) ................................ 2013-220085

(51) Int. Cl.
*H04N 7/18* (2006.01)
*H04N 5/225* (2006.01)
(Continued)

(52) U.S. Cl.
CPC ..... *H04N 1/00251* (2013.01); *H04N 1/00814* (2013.01); *H04N 1/33376* (2013.01);
(Continued)

(58) Field of Classification Search
USPC .................. 386/200–234, 239–248
See application file for complete search history.

(56) References Cited

U.S. PATENT DOCUMENTS

2006/0066891 A1\* 3/2006 Ikeda .................... G06F 3/1222
358/1.15
2007/0024921 A1\* 2/2007 Ohta .................. H04N 1/00249
358/448

(Continued)

FOREIGN PATENT DOCUMENTS

JP 2000-333159 A 11/2000

*Primary Examiner* — Hung Dang
(74) *Attorney, Agent, or Firm* — Rossi, Kimms & McDowell LLP

(57) ABSTRACT

An information processing system that automatically configures settings for functional cooperation between an information processing apparatus and an image pickup apparatus. The information processing system includes a network camera and an MFP configured to receive predetermined information from the camera. A CPU of the camera sends the predetermined information to the MFP when an approach of a user to the MFP is detected. The CPU sets a detection frame extracted from image data obtained by picking up an image of the MFP, to detect the user's approach thereto. Then, the CPU determines whether the detection frame has a size equal to or larger than a predetermined threshold. When the size of the detection frame is not equal to or larger than the predetermined threshold, the CPU detects whether or not the user has approached the MFP, using the detection frame.

10 Claims, 5 Drawing Sheets

(51) Int. Cl.
*H04N 5/77* (2006.01)
*H04N 1/00* (2006.01)
*H04N 1/333* (2006.01)

(52) U.S. Cl.
CPC ......... *H04N 1/33392* (2013.01); *H04N 7/188* (2013.01); *H04N 2201/0094* (2013.01)

(56) References Cited

U.S. PATENT DOCUMENTS

| | | | | |
|---|---|---|---|---|
| 2011/0128386 | A1* | 6/2011 | Letessier | G06F 3/0425 348/164 |
| 2012/0218179 | A1* | 8/2012 | Oba | H04N 21/4223 345/156 |
| 2012/0293642 | A1* | 11/2012 | Berini | G06F 21/32 348/77 |
| 2013/0002884 | A1* | 1/2013 | Nakagawara | H04N 5/23212 348/169 |
| 2014/0002843 | A1* | 1/2014 | Miyamoto | H04N 1/00896 358/1.13 |

* cited by examiner

INFORMATION PROCESSING SYSTEM CAPABLE OF AUTOMATICALLY CONFIGURING SETTINGS FOR FUNCTIONAL COOPERATION BETWEEN APPARATUSES, IMAGE PICKUP APPARATUS, METHOD OF CONTROLLING THE IMAGE PICKUP APPARATUS, AND STORAGE MEDIUM

BACKGROUND OF THE INVENTION

Field of the Invention

The present invention relates to an image processing system, an image pickup apparatus, a method of controlling the image pickup apparatus, and a storage medium.

Description of the Related Art

With improvement of the computational performance of network cameras and the image quality of images picked up by the network cameras, there have been proposed not only an application for video recording for monitoring, but also various other applications including one for functional cooperation with an information processing apparatus. Further, a multifunction peripheral as an example of the information processing apparatus has come to have more and more complicated functions, and even a function that cannot be realized by a single multifunction peripheral is now demanded so as to improve office productivity, for example.

To cope with this situation, there has been proposed to cause a network camera to cooperate with a multifunction peripheral to thereby improve the functionality of the multifunction peripheral.

For example, a multifunction peripheral has a function for shifting to a power saving mode when it is not in use so as to reduce power consumption. In the power saving mode, it is preferable to de-energize components including sensors so as to minimize power consumption, but in a case where a sensor for detecting a user is de-energized, the multifunction peripheral cannot detect an approach of the user.

For this reason, de-energization of the sensor for detecting a user has a problem that the user cannot use the multifunction peripheral at any time the user desires to use it.

To solve this problem, there has been proposed a functional cooperation in which upon detection of a user's approach, a network camera transmits a wakeup packet to a multifunction peripheral which cooperates with the network camera so as to cancel the power saving mode of the multifunction peripheral.

In order to achieve the functional cooperation, it is required to configure how the network camera monitors which multifunction peripheral and how the network camera makes notification to the multifunction peripheral. This configuration is complicated and troublesome because a network camera is not provided with a user interface device, such as a liquid crystal panel and a keyboard.

As a technique for automating the above-mentioned configuration, there has been proposed one in which a plurality of monitoring cameras are each provided with a function of detecting features of a monitoring target, such as the size, motion, etc. of the same, then calculating priorities of monitoring from the features, and sending the result of the calculation to a controller connected to a network, and the controller gives a monitoring priority right to one of the monitoring cameras based on the received priorities to thereby monitor a video signal from the monitoring camera to which the monitoring priority right is given (see Japanese Patent Laid-Open Publication No. 2000-333159).

To realize return of the multifunction peripheral from the power saving mode by functional cooperation, each network camera is required to store settings of a detection frame within a picked-up image so as to determine that a user's approach has been sensed.

The settings of a detection frame can be determined by extracting feature points from the shape of the multifunction peripheral and performing object recognition processing on the feature points.

However, the positional relationship between a multifunction peripheral and a network camera differs depending on the situation of installation of the apparatuses, and hence it is required to change the settings depending on the positional relationship, which is very troublesome.

Further, even when the settings are configured according to the installation situation, the settings can be made invalid e.g. due to layout change or location of an obstacle, and a check operation for checking a cause of the invalid condition is also troublesome.

SUMMARY OF THE INVENTION

The present invention provides an information processing system capable of automatically configuring settings for enabling appropriate execution of functional cooperation between an information processing apparatus and an image pickup apparatus, an image pickup apparatus, a method of controlling the image pickup apparatus, and a storage medium.

In a first aspect of the present invention, there is provided a image pickup apparatus that notifies predetermined information to an information processing apparatus in a case where an approach of a user to the information processing apparatus is detected, comprising a detection frame-setting unit configured to set a detection frame extracted from picked-up image data obtained by picking up an image of the information processing apparatus, so as to detect the user's approach to the information processing apparatus, a determination unit configured to determine whether or not the detection frame set by the detection frame-setting unit has a size equal to or larger than a predetermined threshold value, and a detection unit configured to detect whether or not the user has approached the information processing apparatus, using the detection frame, in a case where it is determined by the determination unit that the size of the detection frame is not equal to or larger than the predetermined threshold value.

In a second aspect of the present invention, there is provided an information processing system including an image pickup apparatus and an information processing apparatus configured to receive predetermined information from the image pickup apparatus, wherein the image pickup apparatus notifies the predetermined information to the information processing apparatus in a case where an approach of a user to the information processing apparatus is detected, and comprises a detection frame-setting unit configured to set a detection frame extracted from picked-up image data obtained by picking up an image of the information processing apparatus, so as to detect the user's approach to the information processing apparatus, a determination unit configured to determine whether or not the detection frame set by the detection frame-setting unit has a size equal to or larger than a predetermined threshold value, and a detection unit configured to detect whether or not the user has approached the information processing apparatus, using the detection frame, in a case where it is determined by the determination unit that the size of the detection frame is not equal to or larger than the predetermined threshold value.

In a third aspect of the present invention, there is provided a method of controlling an image pickup apparatus that notifies predetermined information to an information processing apparatus in a case where an approach of a user to the information processing apparatus is detected, comprising setting a detection frame extracted from picked-up image data obtained by picking up an image of the information processing apparatus, so as to detect the user's approach to the information processing apparatus, determining whether or not the detection frame set by said setting of the detection frame has a size equal to or larger than a predetermined threshold value, and detecting whether or not the user has approached the information processing apparatus, using the detection frame, in a case where it is determined by said determining that the size of the detection frame is not equal to or larger than the predetermined threshold value.

In a fourth aspect of the present invention, there is a non-transitory computer-readable storage medium storing a computer-executable program for executing a method of controlling an image pickup apparatus that notifies predetermined information to an information processing apparatus in a case where an approach of a user to the information processing apparatus is detected, wherein the method comprises setting a detection frame extracted from picked-up image data obtained by picking up an image of the information processing apparatus, so as to detect the user's approach to the information processing apparatus, determining whether or not the detection frame set by said setting of the detection frame has a size equal to or larger than a predetermined threshold value, and detecting whether or not the user has approached the information processing apparatus, using the detection frame, in a case where it is determined by said determining that the size of the detection frame is not equal to or larger than the predetermined threshold value.

According to the present invention, in a case where it is determined that the size of the detection frame extracted and set so as to detect an approach of a user is not equal to or larger than the predetermined threshold value, detection of whether or not the user has approached the information processing apparatus is performed using the detection frame. This makes it possible to automatically configure settings for enabling appropriate detection of the user. Therefore, according to the present invention, it is possible to provide an information processing system capable of automatically configuring settings for enabling appropriate execution of functional cooperation between an information processing apparatus and an image pickup apparatus, an image pickup apparatus, a method of controlling the image pickup apparatus, and a storage medium.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
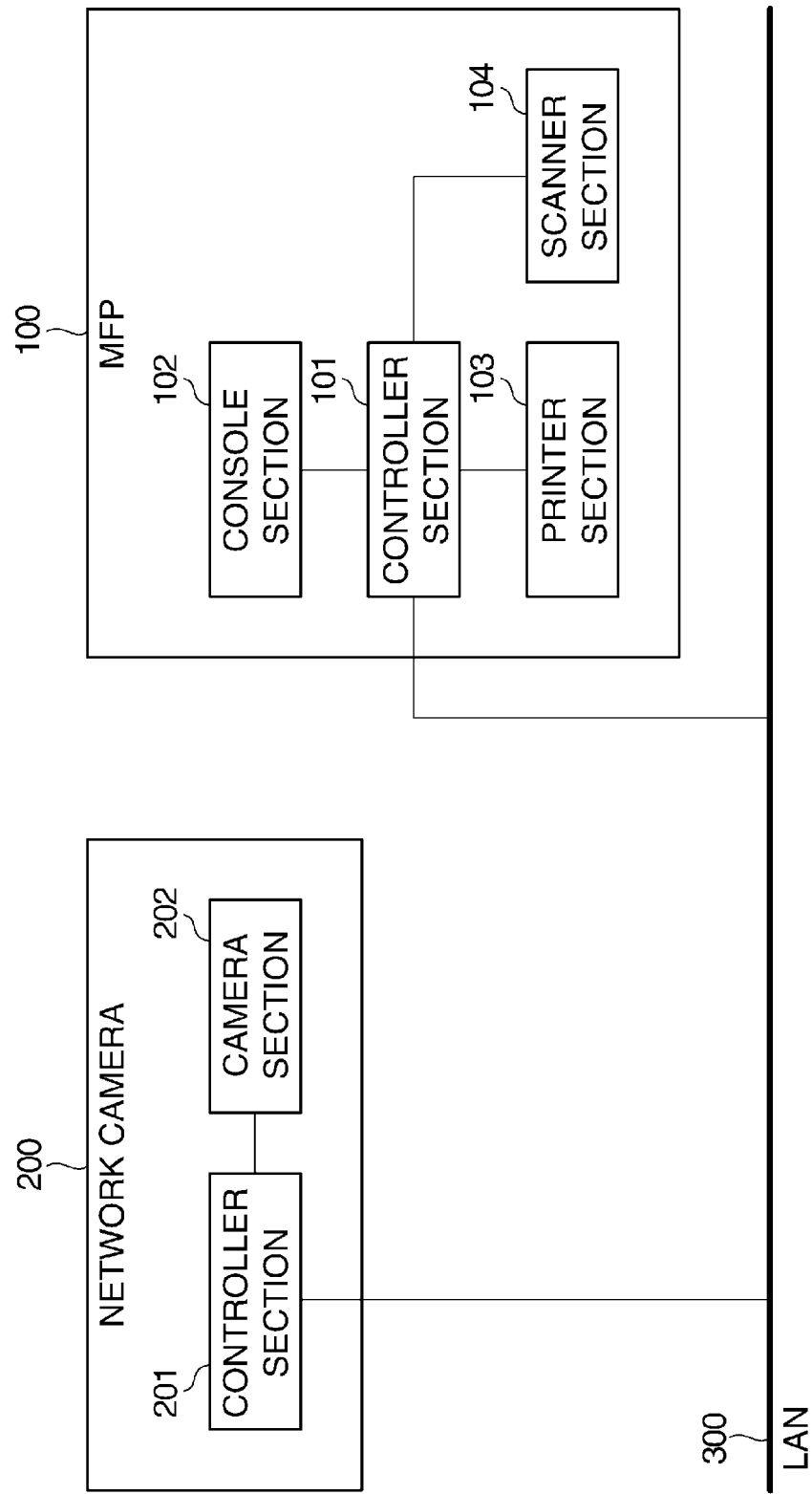
FIG. 1 is a block diagram of an information processing system according to an embodiment of the present invention.

FIG. 1 is a block diagram of an information processing system 1 according to an embodiment of the present invention.

Referring to FIG. 1, the information processing system 1 is comprised of an image forming apparatus (hereinafter referred to as "the MFP") 100 as an information processing apparatus, and a network camera 200 as an image pickup apparatus, which are interconnected by a LAN 300.

The MFP 100 is comprised of a controller section 101, a console section 102, a printer section 103, and a scanner section 104.

The controller section 101 controls the overall operation of the MFP 100. The console section 102 is connected to the controller section 101 to display various kinds of information for a user and receive an operation input from the user. The printer section 103 is connected to the controller section 101 to print an image on a recording medium, such as a sheet. The scanner section 104 is connected to the controller section 101 to read an original image and output image data indicative of the original image.

The network camera 200 delivers a wakeup packet to the MFP 100, as predetermined information to be output when an approach of a user to the MFP 100 is detected, so as to instruct the MFP 100 to cancel a power saving mode of the MFP 100.

The network camera 200 is comprised of a controller section 201 and a camera section 202.

The controller section 201 controls the overall operation of the network camera 200. The camera section 202 is connected to the controller section 201 to output picked-up image data.

Figure 2:
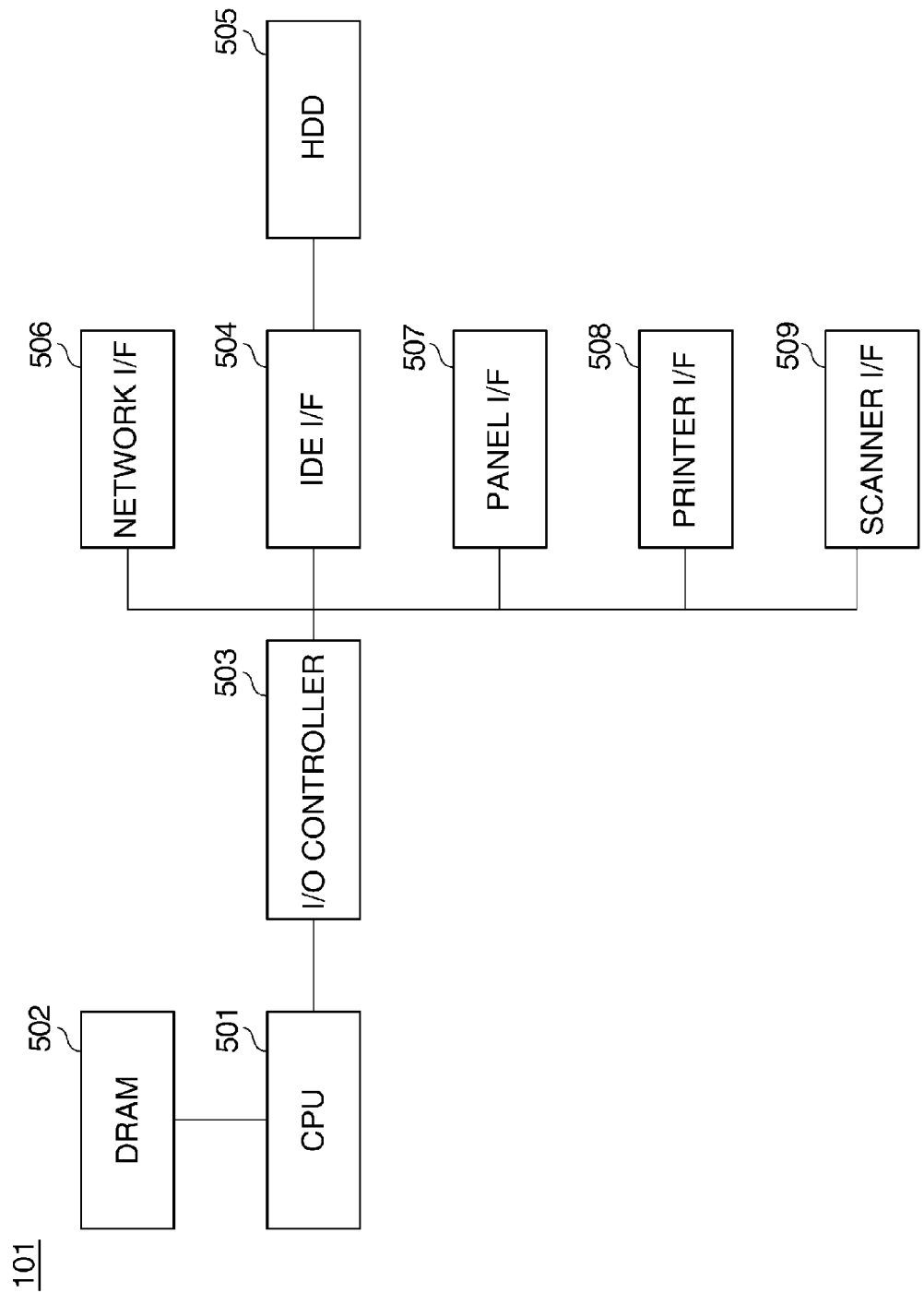
FIG. 2 is a block diagram of a controller section of an MFP appearing in FIG. 1.

FIG. 2 is a block diagram of the controller section 101 of the MFP 100 appearing in FIG. 1.

Referring to FIG. 2, the controller section 101 is comprised of a CPU 501, a DRAM 502, an I/O controller 503, a network interface 506, an IDE (integrated device electronics) interface 504, a panel interface 507, a printer interface 508, a scanner interface 509, and an HDD 505.

The CPU 501 controls the components of the controller section 101 to thereby control the overall operation of the MFP 100. The CPU 501 is connected to the DRAM 502 via a bus.

The DRAM 502 is used by the CPU 501, as a work memory for temporarily loading data of programs of operation instructions and data to be processed, for arithmetic operation.

The CPU 501 is connected to the I/O controller 503 via a bus. The I/O controller 503 performs inputting and outputting of information to and from the components of the controller section 101 in response to instructions from the CPU 501. The I/O controller 503 is connected to the IDE interface 504, and the IDE interface 504 is connected to the HDD 505.

The CPU 501 uses the HDD 505 so as to permanently store programs used for realizing functions provided for an image forming apparatus, read document data, and so forth.

The I/O controller 503 has the network interface 506 connected thereto, and the CPU 501 communicates with the LAN 300 via the network interface 506.

The I/O controller 503 has the panel interface 507 connected thereto, and the CPU 501 displays various kinds of information on the console section 102 and detects details of operation inputs from a user, via the panel interface 507.

The I/O controller 503 has the printer interface 508 connected thereto, and the CPU 501 controls the printer section 103 via the printer interface 508.

The I/O controller 503 has the scanner interface 509 connected thereto, and the CPU 501 controls the scanner section 104 via the scanner interface 509.

With the above-described configuration, when the copy function is to be performed, the CPU 501 loads a program therefor into the DRAM 502 from the HDD 505 via the IDE interface 504.

Then, the CPU 501 detects a copy instruction given to the console section 102 by the user via the panel interface 507 according to the program loaded in the DRAM 502.

Upon detecting the copy instruction, the CPU 501 stores, via the scanner interface 507, image data which the scanner section 104 outputs by reading an original, in the DRAM 502.

The CPU 501 performs a color conversion process and the like process on the image data stored in the DRAM 502 so as to make the image data suitable for printing. The CPU 501 transfers the image data stored in the DRAM 502 to the printer section 103 via the printer interface 508, and the printer section 103 prints the image data on a recording medium.

Figure 3:
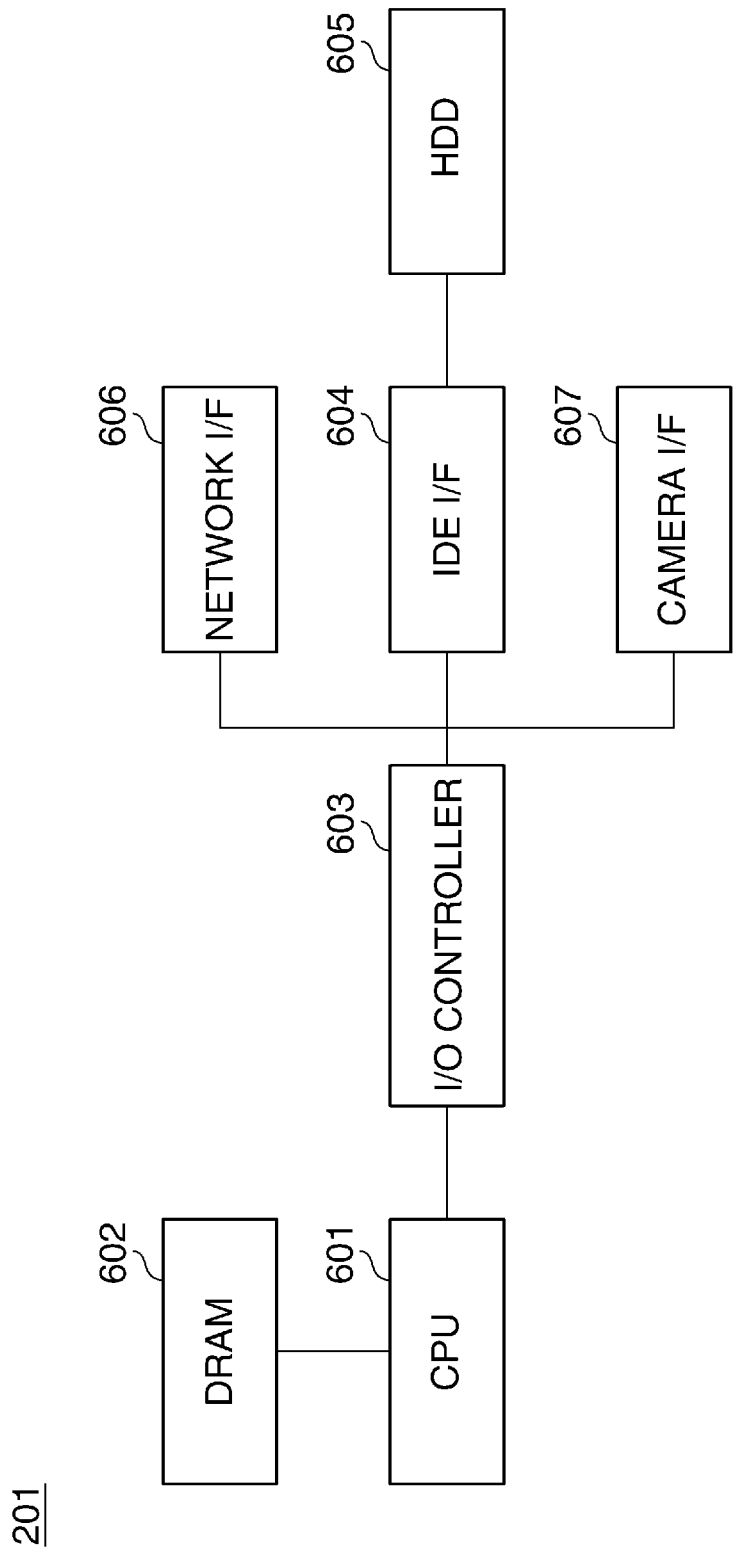
FIG. 3 is a block diagram of a controller section of a network camera appearing in FIG. 1.

FIG. 3 is a block diagram of the controller section 201 of the network camera 200 appearing in FIG. 1.

Referring to FIG. 3, the controller section 201 is comprised of a CPU 601, a DRAM 602, an I/O controller 603, a network interface 606, an IDE interface 604, a camera interface 607, and an HDD 605.

The CPU 601 controls the components of the controller section 201 to thereby control the overall operation of the network camera 200.

The CPU 601 is connected to the DRAM 602 via a bus.

The DRAM 602 is used by the CPU 601, as a work memory for temporarily loading data of programs of operation instructions and data to be processed, for arithmetic operation.

The CPU 601 is connected to the I/O controller 603 via a bus. The I/O controller 603 performs inputting and outputting of information to and from the components of the controller section 201 in response to instructions from the CPU 601. The I/O controller 603 is connected to the IDE interface 604, and the IDE interface 604 is connected to the HDD 605.

The CPU 601 uses the HDD 605 so as to permanently store programs for realizing functions provided for a network camera, picked-up image data acquired by shooting, and so forth.

The I/O controller 603 has the network interface 606 connected thereto, and the CPU 601 communicates with the LAN 300 via the network interface 606.

The I/O controller 603 has the camera interface 607 connected thereto, and the CPU 601 achieves a shooting process using the camera section 202 via the camera interface 607.

With the above-described configuration, when performing a monitoring image-storing function, the CPU 601 loads a program therefor into the DRAM 602 from the HDD 605 via the IDE interface 604.

Then, the CPU 601 instructs the camera section 202 via the camera interface 607 to store a video image, according to the program loaded in the DRAM 602. Upon receiving picked-up image data from the camera section 202, the CPU 601 stores the picked-up image data in the HDD 605.

Next, a description will be given of an operation performed during cooperation between the MFP 100 and the network camera 200. In a case where the MFP 100 and the network camera 200 cooperate with each other for returning the MFP 100 from the power saving mode, the CPU 601 of the network camera 200 operates in a monitoring mode in which monitoring is performed according to cooperation settings stored in the HDD 605.

In order to configure the cooperation settings, information is necessary which indicates correspondence between a detection frame provided within a shooting area and a network address of the MFP 100.

The CPU 601 sequentially loads picked-up image data items received from the camera section 202 into the DRAM 602 to thereby determine whether or not there is any person having entered the detection frame. If such a person exists, the CPU 601 determines that a person has approached the MFP 100 and delivers a wakeup packet to the MFP 100.

When the MFP 100 receives the wakeup packet, the CPU 501 instructs each of the components connected to the IDE interface 504, the panel interface 507, the printer interface 508, and the scanner interface 509, respectively, to execute activation processing.

In response to the instruction for executing activation processing, each of the HDD 505, the console section 102, the printer section 103, and the scanner section 104 executes the activation processing, whereby the MFP 100 returns from the power saving mode.

Figure 4:
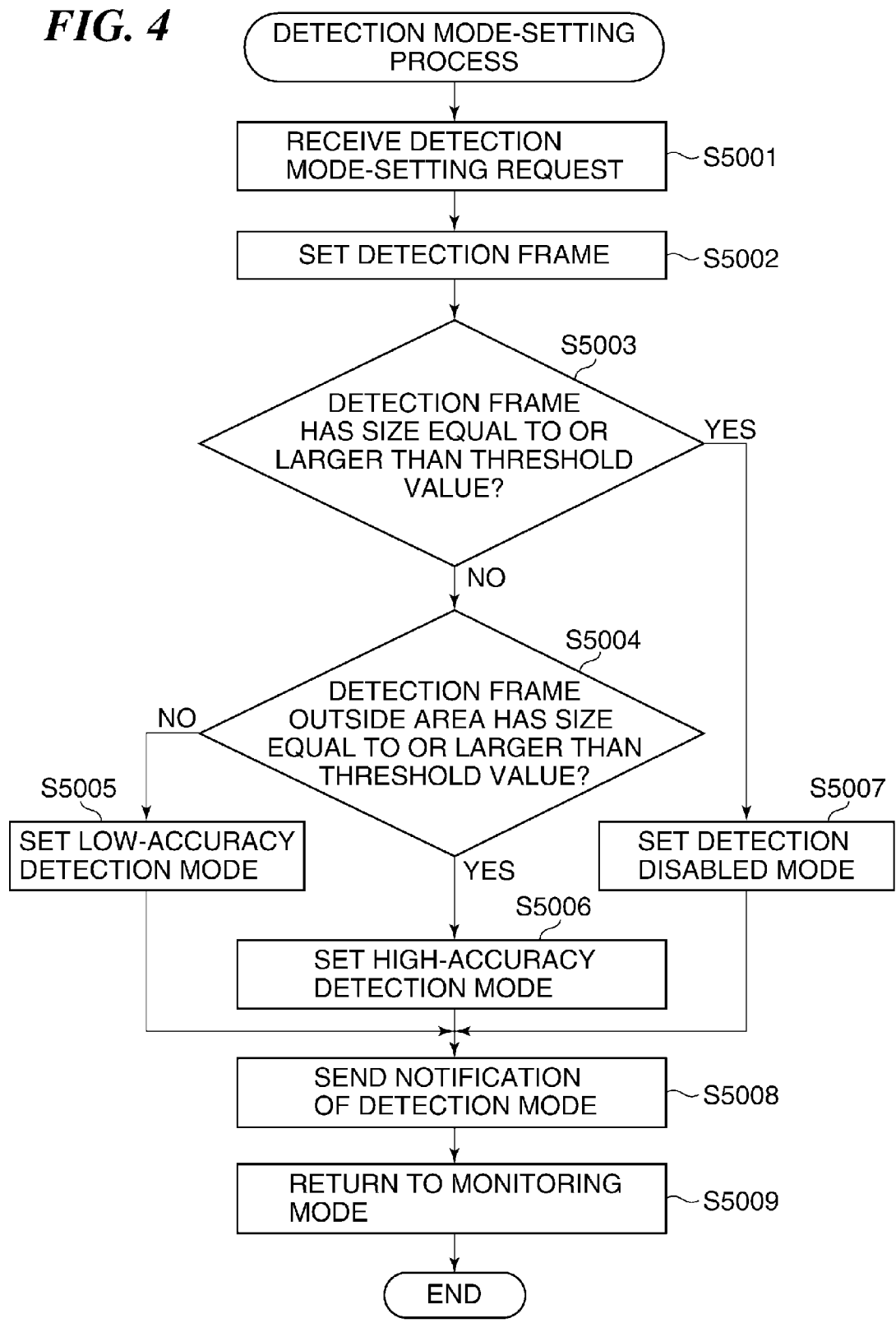
FIG. 4 is a flowchart of a detection mode-setting process executed by a CPU appearing in FIG. 3.

FIG. 4 is a flowchart of a detection mode-setting process performed by the CPU 601 appearing in FIG. 3.

Referring to FIG. 4, the network camera 200 receives a detection mode-setting request from the MFP 100 (step S5001). Then, a detection frame is set on picked-up image data acquired from the camera section 202 (step S5002). The step S5002 corresponds to the operation of a detection frame-setting unit configured to set a detection frame extracted from picked-up image data obtained by picking up an image of the information processing apparatus, so as to detect an approach of a user. Note that how a detection frame is set will be described hereinafter.

Then, it is determined whether or not the size of the detection frame is equal to or larger than a threshold value (step S5003). The step S5003 corresponds to the operation of a determination unit configured to determine whether or not the size of the set detection frame is equal to or larger than a predetermined threshold value. Note that the size of a detection frame will be described hereinafter.

If it is determined in the step S5003 that the size of the detection frame is equal to or larger than the threshold value (YES to the step S5003), the detection mode is set to a detection disabled mode (step S5007), and then the CPU 601 proceeds to a step S5008.

On the other hand, if it is determined in the step S5003 that the size of the detection frame is not equal to or larger than the threshold value (NO to the step S5003), it is determined whether or not the size of a detection frame outside area is equal to or larger than a threshold value (step S5004). The step S5004 corresponds to another determination unit configured to determine whether or not the size of a detection frame outside area which is an area outside the detection frame is equal to or larger than another predetermined threshold value. Note that the size of the detection frame outside area will be described hereinafter.

If it is determined in the step S5004 that the size of the detection frame outside area is not equal to or larger than the threshold value (NO to the step S5004), the detection mode is set to a low-accuracy detection mode (step S5005), and then the CPU 601 proceeds to the step S5008.

On the other hand, if it is determined in the step S5004 that the size of the detection frame outside area is equal to or larger than the threshold value (YES to the step S5004), the detection mode is set to a high-accuracy detection mode (step S5006).

When the low-accuracy detection mode is set in the step S5005 or the high-accuracy detection mode is set in the step S5006, the CPU 601 starts detection using the detection frame in the set mode.

The steps S5005 and S5006 correspond to the operation of a detection unit configured to detect whether or not a user has approached the information processing apparatus, using a detection frame, in a case where the size of the detection frame is not equal to or larger than a predetermined threshold value.

Then, the CPU 601 notifies the MFP 100 of the detection mode set in the step S5005, S5006, or S5007 (step S5008), and returns to the monitoring mode (step S5009), followed by terminating the present process.

Now, a description will be given of how a detection frame is set. To set a detection frame, feature points extracted from an object corresponding to the MFP 100 are stored in the HDD 605 beforehand, and object detection is performed on picked-up image data using the feature points.

When the size and orientation of the MFP 100 are detected through the object detection, the position and size of the detection frame are set such that the detection frame corresponds to an area of one meter square in front of the MFP 100.

Although in the present example, the area of the detection frame is set to one meter square, it may be set to an area other than one meter square, in a manner adapted to the shape and size of the MFP 100. Detection frame information indicative of the set detection frame is stored in the HDD 605.

Next, a description will be given of the size of a detection frame. For example, when the size of a detection frame is much larger than an imaging area, there is a possibility that appropriate detection cannot be performed.

To cope with such a case, a reference threshold value is set in advance for comparison with the size of the detection frame, and when the size of the detection frame is equal to or larger than the threshold value, the detection disabled mode is set.

The reference threshold value is determined based on a plurality of factors, such as the size of the MFP 100 and the view angle and resolution of the network camera 200, so that it is possible to detect a user's approach appropriately, by determining the reference threshold value based on the specifications of the MFP 100 and the network camera 200, experiments using the MFP 100 and the network camera 200, etc.

On the other hand, when the size of a detection frame is too small, there is a high possibility that an object cannot be recognized. However, taking into consideration a case where the network camera 200 is implemented with sufficiently high recognition performance, it is necessary to set a threshold value as a lower limit of the detection frame size, and perform comparison between the size of the detection frame and the threshold value.

Next, a description will be given of the size of an detection frame outside area. When the size of an detection frame outside area is sufficiently large, it is possible to distinguish between a user and a passer-by by detecting the user's state prior to entering the detection frame.

Therefore, a reference threshold value is set in advance, and comparison is performed between the size of the detection frame outside area and the threshold value.

When the size of the detection frame outside area is not equal to or larger than the threshold value, it is impossible to detect the user's state prior to entering the detection frame, and therefore the low-accuracy detection mode is set. In the low-accuracy detection mode, a passer-by can be erroneously detected as the user, but it is possible to return the MFP 100 from the power saving mode without keeping the user waiting.

On the other hand, when the size of the detection frame outside area is equal to or larger than the threshold value, it is possible to analyze the user's action prior to entering the detection frame, and therefore the high-accuracy detection mode is set. The high-accuracy detection mode is a mode for detecting whether or not the user has approached the MFP 100 in a manner specifically distinguishing a user who is about to use the MFP 100 and a passer-by who passes by the MFP 100.

In the high-accuracy detection mode, when a passer-by is detected, the MFP 100 is not returned from the power saving mode, so that it is possible to reduce the power consumption of the MFP 100 more than otherwise.

Note that in the above-described detection mode-setting process, the MFP 100 sends a detection mode-setting request to a network camera or network cameras 200 set by the MFP 100 in advance.

This makes it possible to apply the above-described detection mode-setting process even to a case where images of a plurality of MFPs can be picked up by the same network camera and a case where an image of the same MFP can be picked up by a plurality of network cameras. The detection mode can be automatically switched by executing the detection mode-setting process.

According to the detection mode-setting process in FIG. 4, when it is determined that the size of the detection frame extracted and set so as to detect an approach of a user is not equal to or larger than the predetermined threshold value (NO to the step S5003), detection of whether or not the user has approached the information processing apparatus is performed using the detection frame (steps S5005, S5006), so that it is possible to automatically configure the settings for enabling appropriate detection of the user. Thus, the present embodiment makes it possible to automatically configure settings for appropriately performing functional cooperation between an information processing apparatus and an image pickup apparatus.

After a detection mode is set through the detection mode-setting process, it can occur that the positional relationship between the network camera 200 and the MFP 100 is changed, and therefore it is required to perform re-detection.

Figure 5:
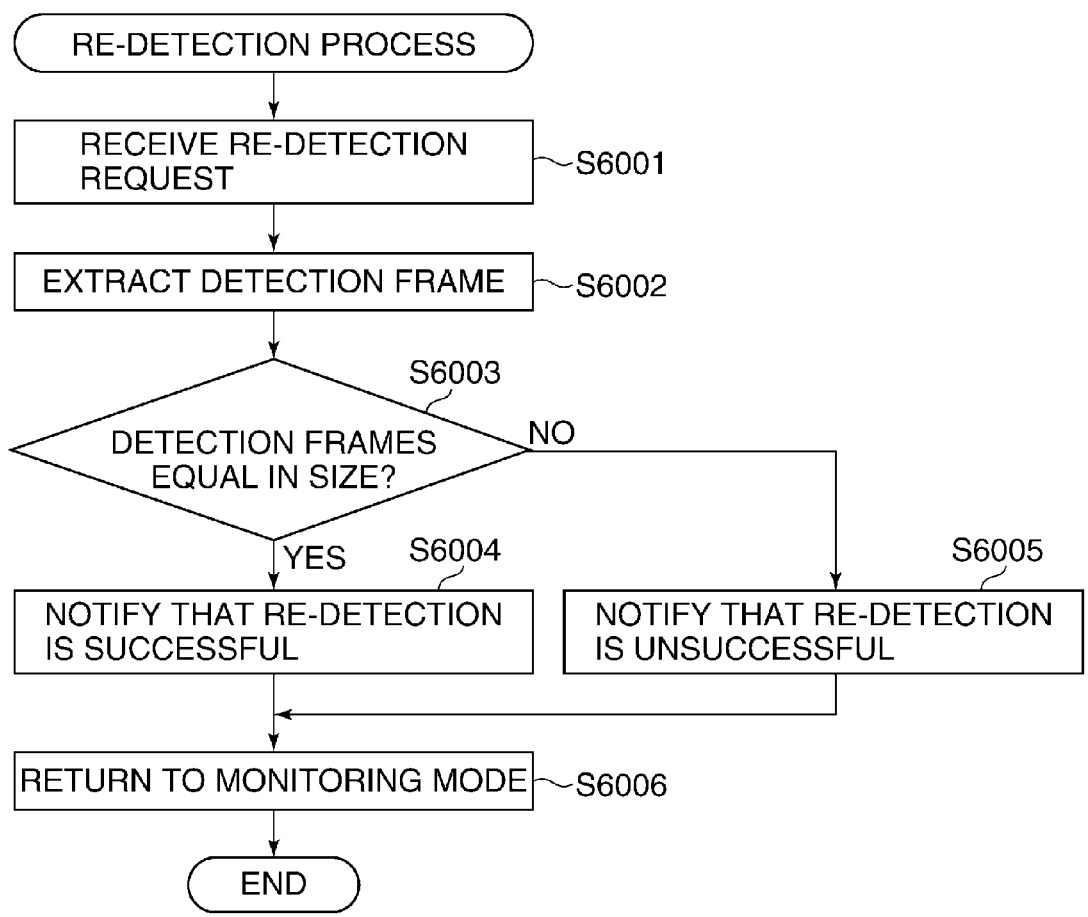
FIG. 5 is a flowchart of a re-detection process performed by the CPU.

FIG. 5 is a flowchart of a re-detection process performed by the CPU 601 appearing in FIG. 3.

Referring to FIG. 5, the network camera 200 receives a re-detection request from the MFP 100 (step S6001).

Then, a detection frame is extracted from the picked-up image data acquired from the camera section 202 (step S6002), and detection frame information indicative of the detection frame set in the detection mode-setting process is acquired from the HDD 605 for comparison with the extracted detection frame.

Then, it is determined, based on the result of the comparison, whether or not the detection frame set in the detection mode-setting process and the extracted detection frame are equal in size (step S6003).

If it is determined in the step S6003 that the two detection frames are not equal in size (NO to the step S6003), the CPU 601 notifies the MFP 100 that the re-detection is unsuccessful (step S6005), and returns to the monitoring mode (step S6066), followed by terminating the present process.

On the other hand, if it is determined in the step S6003 that the two detection frames are equal in size (YES to the step S6003), the CPU 601 notifies the MFP 100 that the re-detection is successful (step S6004), and returns to the monitoring mode (step S6006), followed by terminating the present process.

In the above-described process, the case where the two detection frames are different in size from each other indicates that the position of at least one of the MFP 100 and the network camera 200 has changed and hence the size of a detection frame to be held as a cooperation setting is invalid. Such an invalid setting state can occur due to a layout change, location of an obstacle, or the like.

When notified of the failure of re-detection, the MFP 100 needs to prompt a user to re-configure the cooperation setting. Alternatively, the MFP 100 may automatically perform configuration of cooperation settings and then notify a user of the fact alone.

As shown in the re-detection process, a detection frame is extracted anew, and when the extracted new detection frame is different in size from the preceding detection frame, the preceding one is determined as invalid. This makes it possible to automatically detect invalidity of the settings of a detection mode in a case where the positional relationship between the MFP 100 and the network camera 200 has been changed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-220085 filed Oct. 23, 2013, which is hereby incorporated by reference herein in its entirety.

What is claimed is:

1. An image pickup apparatus configured to notify predetermined information to an information processing apparatus in a case where an approach of a user to the information processing apparatus is detected, comprising:
 a non-transitory computer-readable storage medium storing a computer-executable program; and
 a computer communicatively connected to the non-transitory computer-readable storage medium and configured by the computer-executable program at least to:
 set a detection frame extracted from picked-up image data obtained by picking up an image of the information processing apparatus, so as to detect the user's approach to the information processing apparatus;
 determine whether or not the set detection frame has a size at least larger than a predetermined threshold value;
 enable a function of detecting whether or not the user has approached the information processing apparatus, using the detection frame, in a case where it is determined that the size of the detection frame at least is not larger than the predetermined threshold value; and
 disable the function of detecting whether or not the user has approached the information processing apparatus, using the detection frame, in a case where it is determined that the size of the detection frame at least is larger than the predetermined threshold value.

2. The image pickup apparatus according to claim 1, wherein the computer is configured by the computer-executable program at least to:
 determine whether or not a detection frame outside area outside the set detection frame has a size at least larger than another predetermined threshold value; and
 in a case where it is determined that the detection frame outside area has a size at least larger than the another predetermined threshold value, distinguish between a user who is about to use the information processing apparatus and a passer-by who passes by the information processing apparatus, to thereby detect whether or not the user has approached the information processing apparatus.

3. The image pickup apparatus according to claim 1, wherein the detection frame is extracted anew, and in a case where the extracted new detection frame is different in size from a preceding detection frame, the preceding detection frame is made invalid.

4. The image pickup apparatus according to claim 1, wherein the predetermined information is for canceling a power saving mode of the information processing apparatus.

5. An information processing system including an image pickup apparatus and an information processing apparatus configured to receive predetermined information from the image pickup apparatus,
 wherein the image pickup apparatus is configured to notify the predetermined information to the information processing apparatus in a case where an approach of a user to the information processing apparatus is detected, and comprises:

a non-transitory computer-readable storage medium storing a computer-executable program; and
a computer communicatively connected to the non-transitory computer-readable storage medium and configured by the computer-executable program at least to:
set a detection frame extracted from picked-up image data obtained by picking up an image of the information processing apparatus, so as to detect the user's approach to the information processing apparatus;
determine whether or not the set detection frame has a size at least larger than a predetermined threshold value;
enable a function of detecting whether or not the user has approached the information processing apparatus, using the detection frame, in a case where it is determined that the size of the detection frame at least is not larger than the predetermined threshold value; and
disable the function of detecting whether or not the user has approached the information processing apparatus, using the detection frame, in a case where it is determined that the size of the detection frame at least is larger than the predetermined threshold value.

6. The information processing system according to claim 5, wherein the computer is configured by the computer-executable program at least to:
determine whether or not a detection frame outside area outside the set detection frame has a size at least larger than another predetermined threshold value; and
in a case where it is determined that the detection frame outside area has a size at least larger than the another predetermined threshold value, distinguish between a user who is about to use the information processing apparatus and a passer-by who passes by the information processing apparatus, to thereby detect whether or not the user has approached the information processing apparatus.

7. The information processing system according to claim 5, wherein the detection frame is extracted anew, and in a case where the extracted new detection frame is different in size from a preceding detection frame, the preceding detection frame is made invalid.

8. The information processing system according to claim 5, wherein the predetermined information is for canceling a power saving mode of the information processing apparatus.

9. A method of controlling an image pickup apparatus that notifies predetermined information to an information processing apparatus in a case where an approach of a user to the information processing apparatus is detected, comprising:

a computer of the image pickup apparatus setting a detection frame extracted from picked-up image data obtained by picking up an image of the information processing apparatus, so as to detect the user's approach to the information processing apparatus;
the computer determining whether or not the detection frame set by said setting of the detection frame has a size at least larger than a predetermined threshold value;
the computer enabling a function of detecting whether or not the user has approached the information processing apparatus, using the detection frame, in a case where it is determined by said determining that the size of the detection frame at least is not larger than the predetermined threshold value; and
the computer disabling the function of detecting whether or not the user has approached the information processing apparatus, using the detection frame, in a case where it is determined that the size of the detection frame at least is larger than the predetermined threshold value.

10. A non-transitory computer-readable storage medium storing a computer-executable program for executing a method of controlling an image pickup apparatus configured to notify predetermined information to an information processing apparatus in a case where an approach of a user to the information processing apparatus is detected,
wherein the method comprises:
setting a detection frame extracted from picked-up image data obtained by picking up an image of the information processing apparatus, so as to detect the user's approach to the information processing apparatus;
determining whether or not the detection frame set by said setting of the detection frame has a size at least larger than a predetermined threshold value;
enabling a function of detecting whether or not the user has approached the information processing apparatus, using the detection frame, in a case where it is determined by said determining that the size of the detection frame at least is not larger than the predetermined threshold value; and
disabling the function of detecting whether or not the user has approached the information processing apparatus, using the detection frame, in a case where it is determined that the size of the detection frame at least is larger than the predetermined threshold value.

* * * * *